Dec. 7, 1965    M. MARKELS, JR., ETAL    3,222,231
PROCESS FOR PRODUCING FINELY DIVIDED ROUNDED PARTICLES
Filed Sept. 18, 1962
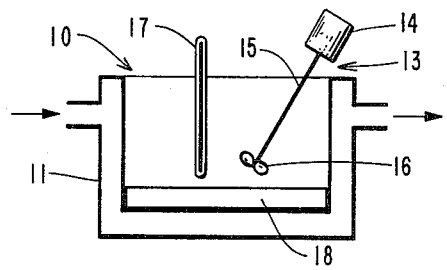
FIG. 1
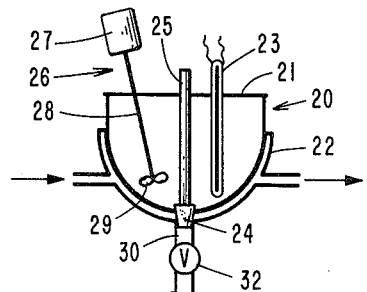
FIG. 2
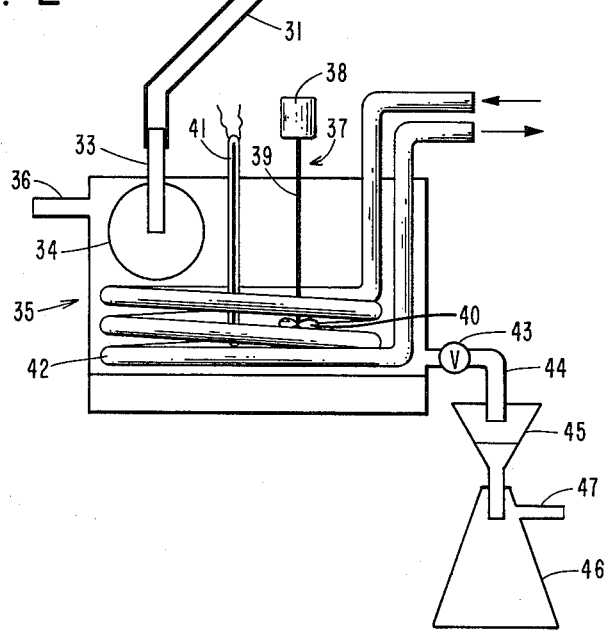
INVENTORS
MICHAEL MARKELS JR.
RICHARD N. EICHBAUER
BY    *Martha L. Ross*
       AGENT

United States Patent Office 3,222,231
Patented Dec. 7, 1965

3,222,231
PROCESS FOR PRODUCING FINELY DIVIDED
ROUNDED PARTICLES
Michael Markels, Jr., Alexandria, and Richard N. Eichbauer, North Springfield, Va., assignors to Atlantic Research Corporation, Fairfax County, Va., a corporation of Virginia
Filed Sept. 18, 1962, Ser. No. 224,895
20 Claims. (Cl. 149—2)

This invention relates to a process for producing finely divided rounded particles. It further relates to a process utilizing a particular combination of operations to obtain the desired particles.

Many methods have been tried in an attempt to obtain very fine rounded particles of various solid compounds. Simple grinding of the compound results in very fine particles but conchoidal fracture and other types of cleavage during grinding leave the particles with sharp edges and jagged contours. Other methods such as shock cooling, spray drying and prilling have also been used. However, in many cases these methods suffer from the disadvantages of insufficient roundness of the final fine particles, undesirable porosity, difficulty in obtaining desired particle size, or the necessity of using complex, expensive apparatus to obtain the desired degree of roundness.

Accordingly, it would be highly advantageous if a simple, inexpensive method for producing very fine particles of solid substance in substantially rounded form could be developed. Such particles are useful in many materials and compositions where their jagged counterparts adversely affect processing or physical properties or limit the range of formulation. For instance, in many cases, it is highly desirable to obtain exceedingly high loadings of very fine particles in a liquid vehicle. The use of substantially rounded particles permits higher loadings than was heretofore possible without any adverse affects on the physical properties of the composition. The use of very fine particles having a substantially rounded configuration has the added advantage of increasing the flowability of such particles to permit easier processing with the liquid vehicle and other ingredients and to lessen the tendency to agglomerate during storage.

The object of this invention is to provide a new and improved process for producing very fine, substantially rounded particles.

Another object of this invention is to provide a new and improved method for treating solutions to obtain fine substantially rounded particles therefrom.

Other objects, advantages and features of this invention will become apparent from the following detailed description and accompanying drawings.

In the drawings:

FIGURE 1 is a schematic cross-sectional view of an apparatus which can be used to carry-out the process of this invention.

FIGURE 2 is a semi-schematic cross-sectional view of another type of apparatus which can be used in this invention.

We have discovered that very fine, substantially rounded particles can be produced by physically precipitating a solute out of solution while simultaneously subjecting the solution to both mechanical agitation and high frequency acoustic vibration. The term, substantially rounded, as employed in the instant specification and claims, refers to particles which are substantially free from sharp or jagged edges and corners and, in general, have rounded contours, at least at the junction of surfaces lying in different planes. The shape of the particles can vary from symmetrical to somewhat irregular and, in general, are substantially symmetrical. The particles obtained by our method have a reduced length to width ratio of from about 3:1 to 1:1. Preferably the ratio is as close to 1:1 as possible, at which point the particles often are spherical or approach spherical contours. The essential feature of this invention is that our process results in the absence of substantially all sharp or jagged contours. The term solution refers to a solid dissolved in a liquid.

The precipitation of a solute from a solution can be accomplished in any convenient manner, as for example, by cooling or evaporating a saturated solution. Although each results in the precipitation of at least part of the solute, cooling is preferable in many cases since no solvent recovery is required. Other methods such as agitation of a supersaturated solution can also be used to induce precipitation of the solute. Wherever expedient, various combinations of these and other methods can be used.

Cooling of a solution in order to reduce the solubility of solutes can be effected in any suitable manner. The vessel containing the solution to be treated can be fitted with a cooling jacket, or cooling coils can be immersed in the solution. An inert cooling material in a solid or liquid state can be added to the solution itself, it merely being necessary to avoid use of a material that dissolves the solute. Typical examples of such coolants are ice, Dry Ice; precooled material such as water, carbon tetrachloride, finely divided solids such as metals, e.g. aluminum, catalysts, e.g. copper chromite, iron oxide, etc.

Heating a solution in order to evaporate the solvent can be effected in any expeditious manner. A jacketed kettle can be used or heating coils can be immersed in the solution.

Mechanical agitation of the solution can be produced in any desirable manner as by stirring, shaking the reaction vessel or rapid recirculation. The rate and amount of agitation is not limited to any particular range, so long as it is sufficient to prevent the precipitating particles from settling out or collecting in pockets which are not subjected to the full effect of the high frequency vibrations and insufficient to break up the rounded precipitating particles into smaller jagged and sharp edged fragments.

The acoustic vibrations in the solution to be treated can be produced by any suitable device such as a tank equipped with a source of high frequency vibrations. Any acoustic type generator such as the piezoelectric type or the magnetostrictive type can be used. For example, a quartz oscillator which is energized by an alternating current generator or a magnetic coil working upon a membrane are illustrative of devices which can be employed in our invention. The frequency of the vibrations can vary from the high audio type to the ultrasonic type, that is, from about 10 to about 150 kilocycles, preferably from about 15 to about 60 kilocycles.

Any soluble solid material which can be precipitated from its solvent can be subjected to the method of this invention in order to obtain finely divided substantially rounded particles of the material. Any solvent for such solid material can be employed so long as the two are substantially chemically inert under the conditions used in this method. Either a weak or a concentrated solution can be used depending upon the solubility of the material. The size of the precipitated solid particles can vary over a wide range, as for example, from about 5 to about 350 microns. By proper manipulation of processing conditions, for example, the rate of precipitation of the substantially rounded particles, the size of such particles can be controlled to a substantial degree.

The process of our invention can be applied advantageously to any soluble solid material of a crystalline nature. Normally such materials precipitate from solution in the form of crystals having sharp edges, jagged contours and, in many cases, large length to width ratios. Such crystalline solids, whose contours can be rounded and whose length to width ratio can be reduced by our process, can be of any chemical constitution, organic or inorganic. Our process is particularly advantageous with very reactive compounds having poor thermal stability at high temperatures. Such compounds decompose before their melting point is reached. Examples of such compounds are ammonium perchlorate, hydrazine nitroform, lithium aluminum hydride, and nitronium perchlorate.

Although any liquid solvent for the particular solid material can be used, it is preferable to use readily available, inexpensive liquids which can be easily manipulated within the processing conditions of our invention. Examples of such solvents are water, methanol, acetone, toluene, ethylene glycol, methyl chloride and diethyl ether. Other solvents such as liquid ammonia, dilute sulfuric acid and concentrated nitric acid can also be used.

Any convenient method can be employed to obtain the solutions of solid material. Merely mixing the two components, solute and solvent, will suffice in many cases. If desirable, the solubility of the solid material in the particular solvent being used can be increased by heating the solvent. Supersaturated solutions can be used within the scope of our invention.

After the solid rounded particles have precipitated, they can be recovered by filtration or centrifugation. The solvent, if recovered during treatment, can be reused.

As aforementioned, it is often highly desirable to mix very large amounts of finely divided solid particles with liquid vehicles or carriers. However, this can result in a mixture of such high viscosity that it is very difficult, if not impossible to process. Such high loadings can result in granular mixes in which the liquid vehicle no longer forms a continuous matrix. The substantially rounded particles of our invention permit improved processibility and considerably higher loadings.

Our method is particularly advantageous for producing finely divided rounded particles of solid oxidizer or other high energy additive such as solid fuels which can be mixed with a liquid vehicle and other ingredients to form propellant compositions. The shape of the oxidizer and fuel is important at high loadings since these high loadings have a pronounced effect on the viscosity of the mix and the ballistic and physical properties of the propellant, whether the final form is liquid, semi-solid, or solid. The maximum loading of solid ingredients in any type of propellant is limited by the processibility of the mix. The use of solid oxidizer or solid fuel in the form of substantially rounded particles permits the processing of more highly loaded mixes of improved performance.

The process of this invention can be used to prepare rounded particles of any type of solid oxidizer, fuel or other additive. Thus solid oxidizer salts such as ammonium, sodium, potassium and lithium perchlorate or nitrate, nitronium perchlorate and hydrazine nitroform, can be produced in the form of finely divided rounded particles by our invention. Finely divided rounded particles of solid fuel such as the hydrides of beryllium, lithium, aluminum and lithium and aluminum; and the azides such as lead can also be obtained.

In the accompanying drawings, more specifically, FIGURE 1, vessel 10 is enclosed by a jacket 11 which has a liquid inlet and outlet. An agitating device such as a stirrer 13 is located contiguous to vessel 10 and comprises motor 14, shaft 15 and blade 16, the latter two of which extend into vessel 10. A thermometer 17 also is located so as to extend into vessel 10. A high frequency acoustic vibrator 18 is located at the bottom of vessel 10. The solutions which are to be treated by the process of our invention can be poured directly into vessel 10 or they can be placed in an intermediate container such as a glass beaker (not shown) which is partially submerged in another liquid in vessel 10.

In FIGURE 2, vessel 20, having an air-tight lid 21 is equipped with a jacket 22 having a liquid inlet and outlet, a thermocouple 23, a plug 24 controlled by rod 25, and a stirrer 26 having motor 27, shaft 28 and blade 29. A tube 30 is connected at its upper end to vessel 20 so that plug 24 acts as a stopper between the two and is connected at its lower end to a Tygon tube 31. A valve 32 is seated in tube 30. Tygon tube 31 is connected at its lower end to another tube 33. A filter bag 34 is attached at the lower end of tube 33, both of which are located in an enclosed high frequency acoustic vessel 35. This vessel can be connected to a vacuum pump (not shown) as by outlet 36. The vessel 35 is equipped with a stirrer 37 having a motor 38, shaft 39 and blade 40, a thermocouple 41, cooling coils 42 having a liquid inlet and outlet and an opening in the lower part which is controlled by valve 43. Tube 44 is connected to the opening at one end and extends into filter 45. Filter 45 is supported by and extends into flask 46. The latter can be connected to a vacuum pump (not shown) through outlet 47.

The following examples are illustrative of the production of finely divided rounded particles by the method of this invention.

*Example I*

A saturated solution of ammonium perchlorate in water at 95° C. was prepared. The solution was poured into a glass beaker which was placed in a water bath at 15° C. contained in a high frequency acoustic tank as schematically represented in FIGURE 1. The tank was operated at a frequency of 20 kilocycles per second. A laboratory stirrer was used to agitate the ammonium perchlorate solution. The solution was subjected to the acoustic vibrations and stirring for 24 hours. The solution had reached a temperature of 46° C. The crystals which precipitated from the solution were washed with acetone and ether and dried. Uniform particles of 70 to 180 microns with a good round shape were obtained.

*Example II*

A saturated water solution of ammonium perchlorate was prepared at 95° C. The solution was poured directly into a stainless steel high frequency acoustic tank as shown in FIGURE 1. The tank was operated at a frequency of 40 kilocycles per second. An Eppenbach mixer was used to provide agitation. After 24 hours the solution reached a final temperature of about 25° C. After removal from the water, the crystals which had precipitated were washed with acetone and ether and dried. Uniformly sized crystals with rounded corners and a generally rounded shape were obtained. The size of the crystals was about 100 microns.

*Example III*

A saturated water solution of ammonium perchlorate was prepared at 95° C. and poured directly into a stainless steel high frequency acoustic tank as shown schematically in FIGURE 1. The tank was operated at a frequency of 90 kilocycles per second. Agitation was provided by an Eppenbach mixer. After 5 hours the solution had reach ambient temperature. At this time, the precipitated crystals were removed from the solution, washed with acetone and ether and dried. Rounded crystals having a particle size of 10 to 20 microns were obtained.

*Example IV*

450 grams of hydrazine nitroform, $N_2H_5C(NO_2)_3$ were dissolved in 1100 grams of methanol at 30° C. This solution was placed in a glass cylinder which was in turn partly immersed in water at 30° C. contained in a high frequency acoustic tank as shown schematically in FIGURE 1. The tank was operated at a frequency of 20 kilocycles per second. Agitation was provided by a laboratory stirrer. After 42 hours, during which a substantial portion of the methanol evaporated, the precipitated crystals were recovered from the solution. Approximately 140 grams of reformed short rod-like crystals having rounded ends and edges and an impoved average length to diameter ratio of about 1.5 to 1 were obtained. The size of the particles was 100–150 microns.

*Example V*

A saturated methanol solution of hydrazine nitroform, $N_2H_5C(NO_2)_3$, was prepared at 55° C. This solution was poured into a high frequency acoustic tank as shown schematically in FIGURE 1. The tank was operated at a frequency of 40 kilocycles per second. The solution was allowed to cool to ambient temperature while being subjected to the high frequency vibrations of the acoustic tank and agitation supplied by an Eppenbach mixer for 24 hours. The final precipitated product recovered from solution was short rod-like crystals having rounded ends and edges and an improved average length to diameter ratio of about 3 to 1. The particle size varied from 100 to 150 microns.

*Example VI*

With particular reference to FIGURE 2, 11,000 cc. of methanol were introduced into mixing tank 20. 11.9 pounds of hydrazine nitroform were then added to the tank. After lid 21 was closed, the mixer 26 was started in order to help dissolve the hydrazine nitroform in the methanol. An additional liter of methanol can be added to the mixing tank or the temperature in the mixing tank can be raised to about 55° C. in order to expedite solution of the hydrazine nitroform in the methanol. A combination of these two treatments can also be used. The clear solution was then filtered by raising stopper 24 by means of rod 25, opening ball valve 32 and allowing the solution to flow through tubes 31 and 33 into a polypropylene filter bag 34. A vacuum pump can be connected to acoustic tank 35 by outlet 36 to increase the rate of filtering. After filtration was completed, the solution was subjected to agitation by mixer 37 and a vibration of 20 kilocycles per second by the acoustic tank 35 for about 24 hours. The temperature of the solution was lowered gradually to 15° C. by flowing cooling water through coils 42. Valve 43 was opened and the solution containing crystals of hydrazine nitroform was filtered through funnel 45 into flask 46. A vacuum pump can be attached at 47 if desired. The crystals were washed with hexane and dried. About 4½ pounds of approximately rounded crystals of hydrazine nitroform having a size of about 100 microns were obtained.

*Example VII*

A solution of lithium aluminum hydride in diethyl ether was prepared in a dry atmosphere. To this solution, again in a dry inert atmosphere, was added approximately 50 percent by volume of dry toluene. The solution was then transferred to an air tight standard vacuum distillation apparatus, the flask of which was placed in a water bath inside a high frequency acoustic tank as shown schematically in FIGURE 1. The solution was subjected to agitation by stirring and a frequency of 20 kilocycles per second by the acoustic tank for 7 hours, during which the diethyl ether was distilled off by vacuum. Precipitated crystals were then removed from the benzene-diethyl ether solution by filtration in a dry atmosphere and vacuum dried for 24 hours. The particles obtained, though of somewhat irregular shape, had rounded contours and ranged from 50 to 300 microns in size.

*Example VIII*

30 grams of nitronium perchlorate were dissolved in nitric acid (100 percent). This solution was filtered into a vacuum flask immersed in a water bath in a high frequency acoustic tank as shown in FIGURE 1. The solution was placed under a vacuum and the nitric acid was evaporated for 1 hour during which time the solution was subjected to agitation with a stirrer and a high frequency acoustic vibration of 20 kilocycles per second. After the crystals precipitated, the solution was again filtered and the crystals were dried under a vacuum for 24 hours. A mixture of substantially spherical particles and irregular rounded particles was obtained.

As will be apparent to those skilled in the art, various other modifications can be carried out from the above disclosure without departing from the spirit and scope of the invention embodied within the claims.

We claim:

1. A process comprising physically precipitating a solid solute out of solution while simultaneously subjecting said solution to both mechanical agitation and high frequency vibration.

2. A process comprising physically precipitating a solid solute out of solution by cooling said solution while simultaneously subjecting said solution to both mechanical agitation and high frequency vibration.

3. A process comprising physically precipitating a solid solute out of solution by evaporating at least a portion of the solvent while simultaneously subjecting said solution to both mechanical agitation and high frequency vibration.

4. A process comprising physically precipitating a solid solute out of solution by cooling said solution and by evaporating at least a portion of the solvent while simultaneously subjecting said solution to both mechanical agitation and high frequency acoustic vibration.

5. The process of claim 1 in which the solid solute is a solid oxidizer.

6. The process of claim 1 in which the solid solute is a solid fuel.

7. The process of claim 5 in which the solid oxidizer is ammonium perchlorate.

8. The process of claim 5 in which the solid oxidizer is hydrazine nitroform.

9. The process of claim 5 in which the solid oxidizer is nitronium perchlorate.

10. The process of claim 6 in which the solid fuel is lithium aluminum hydride.

11. A process comprising dissolving a solid soluble material in a solvent and subsequently physically precipitating said solid material from the resulting solution while simultaneously subjecting said solution to both mechanical agitation and high frequency vibration.

12. A process comprising dissolving a solid soluble material in a solvent and subsequently physically precipitating said solid material from the resulting solution by cooling said solution while simultaneously subjecting said solution to both mechanical agitation and high frequency vibration.

13. A process comprising dissolving a solid soluble material in a solvent and subsequently physically precipitating said solid material from the resulting solution by evaporating at least a portion of the solvent while simultaneously subjecting said solution to both mechanical agitation and high frequency acoustic vibration.

14. A process comprising dissolving a solid soluble material in a solvent and subsequently physically precipitating said solid material from the resulting solution by cooling said solution and by evaporating at least a portion of the solvent while simultaneously subjecting said solution to both mechanical agitation and high frequency vibration.

15. The process of claim 11 in which the solid solute is a solid oxidizer.

16. The process of claim 11 in which the solid solute is a solid fuel.

17. The process of claim 15 in which the solid oxidizer is ammonium perchlorate.

18. The process of claim 15 in which the solid oxidizer is hydrazine nitroform.

19. The process of claim 15 in which the solid oxidizer is nitronium perchlorate.

20. The process of claim 16 in which the solid fuel is lithium aluminum hydride.

References Cited by the Examiner

UNITED STATES PATENTS

| | | | |
|---|---|---|---|
| 2,251,959 | 8/1941 | Smith | 204—154.1 |
| 3,037,839 | 6/1962 | Googin | 23—14.5 |
| 3,037,840 | 6/1962 | Gregory et al. | 23—14.5 |
| 3,097,062 | 6/1963 | Hermans et al. | 23—14.5 |

REUBEN EPSTEIN, *Primary Examiner.*

CARL D. QUARFORTH, *Examiner.*